Figure 1:
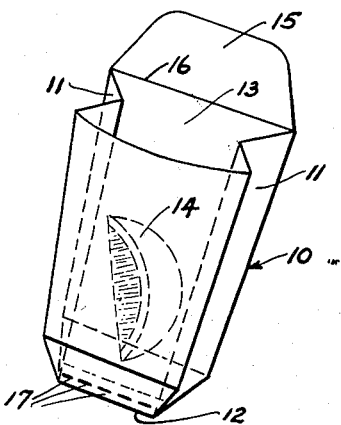

Sept. 14, 1954

L. ECKLER 2,688,914

FRUIT JUICING DEVICE

Filed May 22, 1950

INVENTOR
*Leopold Eckler*
BY
*Henry A Kellog*
ATTORNEY

Patented Sept. 14, 1954

2,688,914

UNITED STATES PATENT OFFICE 2,688,914

FRUIT JUICING DEVICE

Leopold Eckler, Summit, N. J.

Application May 22, 1950, Serial No. 163,468

1 Claim. (Cl. 100—211)

This invention relates to a juicing and straining device and combination for manually expressing juice from fruit or fruit slices, especially citrus fruits, such as lemons, limes, oranges, and the like.

In serving various fish, meat and salad dishes, and beverages, such as iced and hot tea, tomato juice, carbonated drinks, and the like, it is customary to garnish them with a slice of citrus fruit, intended to be manually expressed, according to the desires of the consumer, so that the juice is distributed over the viands, or flavors the beverage. Careful handling is required to avoid dropping the slippery piece of fruit, whereby it is likely to soil the table linen or clothing of the user. Even when the operation is performed without mishap, the juice often spurts in random directions to the discomfort and embarrassment of the user and his table companions. It is almost impossible to manipulate the slice of fruit without soiling the fingers with the juice or at least the oils of the rind, while contact of the juice with the fingers before it reaches the viands or beverage is unsanitary, and in any case, distressing to fastidious persons. As a consequence, the use of finger bowls is necessary. Moreover, seeds when present, are almost invariably expelled on squeezing the fruit, and fall into the beverage or on to the food, to the annoyance of the consumer.

It is an object of this invention to provide a device and its combination with a slice of fruit, for use in manually expressing juice from a fruit slice of the nature indicated above, which prevents contact of the fruit with the fingers during manipulation and thus renders the operation sanitary and unobjectionable; which affords a firm and reliable grip on the fruit so that danger of inadvertently dropping the slice is minimized; which prevents spurting of the juice in random directions; which strains the juice so that seeds and large pieces of pulp are prevented from falling into the food or beverage; and which permits expressing practically all the juice contained in the fruit slice, which is hardly possible with the fingers alone.

In accordance with my invention, the aforesaid device is an envelope of flexible sheet material which is substantially impervious, insoluble, and inert toward the fruit juice during the intended period of contact with the fruit slice until it is pressed to extract the juice, and sufficiently strong or tough to withstand manipulation thereof for expressing the juice of a fruit slice enclosed therein. The aforesaid envelope is preferably flat or at least foldable to a flattened condition to facilitate packaging in quantities, and may be of any desired shape when flattened, e. g., roughly triangular or quadrangular, oval, or circular. At one side (i. e., adjacent or along one edge of the flattened envelope), the envelope has an opening to receive the slice of fruit to be expressed, while at the opposite side (i. e., adjacent or along the opposite edge), the envelope is perforated with small apertures of such size as to permit juice to flow freely through the same, but small enough to prevent passage therethrough of seeds and larger pieces of pulp. The envelope, except for the aforesaid opening and perforations at opposite sides, is sealed, and is thus adapted to enclose a piece of fruit to be expressed. In one of its preferred forms, the envelope also has a flap adapted to fold over and loosely cover the opening through which the piece of fruit is inserted. Alternatively, the end of the envelope including the opening can be folded over along a transverse fold line. My invention further includes the combination of an envelope of the aforesaid type with a piece (e. g., slice, wedge, or other section) of fruit adapted to yield an abundance of juice when manually expressed, especially pulpy fruit, such as the citrus fruits (e. g., lemons, limes, oranges, grapefruit, etc., or other fruits from which juice can be manually expressed such as grapes), inserted or enclosed therein.

In utilizing the device or combination of my invention, a piece of fruit as described above is inserted in the opening at the side of the envelope, and if a flap is provided, this is folded over to cover the opening loosely. This can be done before serving, especially in restaurants where it is desired to impress the guests with careful preparation of the food. The user has only to grasp the envelope and squeeze the fruit enclosed thereby with the perforations directed downward over the food or beverage to be flavored. The expressed juice flows out of the perforations, leaving behind any seeds or pieces of pulp. The envelope prevents spurting of the juice in the vicinity, minimizes danger of dropping the fruit which might otherwise occur because of its inconvenient shape or slippery surface, and prevents contact of the juice with the fingers. Even circular lemon slices can be completely expressed in this manner which would be impossible to do with the fingers alone. Although fruit juices can be expressed by means of metal and glass juicers, such devices are not only expensive and cumbersome, but also require considerable washing after use. The envelopes of this invention are dispensable, and after use are discarded with the fruit residue enclosed therein. By confining the wet pulp, the envelopes prevent corrosion and odors in waste disposal receptacles.

A number of embodiments of my invention are shown in the accompanying drawings, wherein Figures 1 to 5 inclusive, respectively, illustrate various forms of envelopes in perspective or side elevation, with a piece of citrus fruit (indicated by dotted lines) enclosed therein.

Referring to the drawing, Figure 1 shows in perspective an envelope 10 of generally quadrangular shape, having bellows folds 11 and 12 at its sides and base, respectively, so that it can be folded flat for packaging or opened up to have a squared base when fully expanded, like a conventional paper bag. The upper end 13 is open as shown, and is adapted to receive a wedge 14 or other slice of citrus or other pulpy fruit. A flap 15 is preferably provided at one side of the upper end 13, and is foldable along the line 16 to cover the opening. A series of perforations 17 are provided at the base of the envelope, opposite the open end 13. These perforations, shown as slits, can be of any desired shape (e. g., circular, square, triangular or star-shaped), and are of such size as to permit free flow of juice, but small enough to retain seeds and larger pulp fragments of the fruit 14. The envelope 10 can be made of any tough flexible sheet material, substantially impervious, insoluble, and inert toward the fruit juice during use. Thus, it can be made of high wet strength paper (e. g., paper impregnated with melamin-formaldehyde resin) which can be waterproofed if desired (e. g., with paraffin or other wax), or of parchmentized paper, wax paper, or of plastic film material, such as regenerated, moistureproofed cellulose (cellophane), cellulose acetate polyethylene, vinyl chloride-acetate resin, or similar tough pliable film forming plastics. The material employed should be tasteless, ordorless, insoluble in the fruit juice, and retain its toughness when in contact with the fruit or its juice to avoid rupture under the manual pressure required to express the juice from the fruit. Adhesives employed in making the envelope should have similar juice-resistant properties and should also be tasteless and odorless. When thermoplastic materials are used, such as the vinyl resin films, capable of forming a heat-sealed seam, adhesives can be dispensed with in making the envelope.

Figure 2:
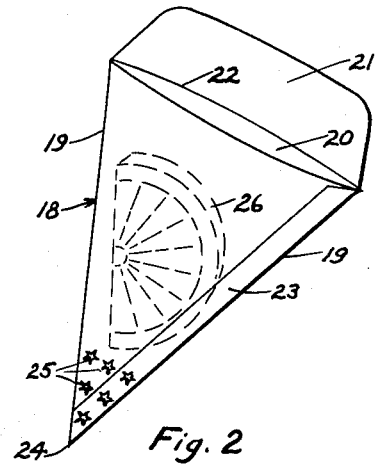

The envelope 18 of Figure 2 is of triangular shape foldable to flat condition along lateral fold lines 19, having an opening 20 along the third side, with a flap 21 foldable over said opening along the fold line 22. The envelope is held together or sealed along the overlapped seam 23 from the apex 24 to the edge of the opening 20. Adjacent the apex 24 a number of perforations 25 are provided, here shown as star shaped and comparable in size to the perforations 17 of Figure 1. The envelope 18 is dimensioned to receive a slice of citrus fruit 26 which is enclosed therein by folding over the flap 21.

Figure 3:
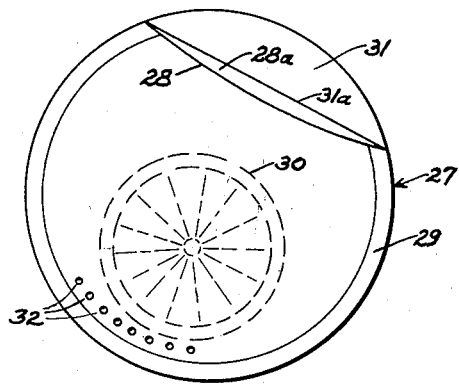

A circular envelope 27 is illustrated in Figure 3 formed of two circular pieces of sheet material, one of which has a minor segment cut off along a chord 28 subtending, for example, an angle of 90 to 120 degrees, and fastened together face to face along their coincident circular edges by a peripheral seam 29. An opening 28a adapted to receive the slice of citrus fruit 30, remains along the chord 28, and the extending segment 31 of the uncut sheet forms a flap which can be folded over along the line 31a to cover the aforesaid opening. A series of perforations 32 are formed near the edge of the envelope opposite said opening. This form of envelope is best made of thermoplastic film, adapted to form a heat sealed seam as indicated at 29.

Figure 4:
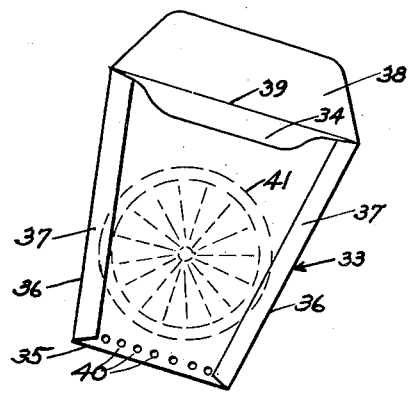

The envelope 33 of Figure 4 is of tapered generally quadrangular shape, having an opening 34 opposite its narrow end 35 (which may be merely a crease or fold of the blank from which the envelope is made) and sealed along its tapered lateral edges 36 by overlapping seams 37. A flap 38 is provided along one side of the opening 34, which is foldable along the line 39 to cover the aforesaid opening. Adjacent the opposite end 35, a series of perforations 40 are provided, similar to the perforations in the envelopes described above. A slice of fruit 41 from which the juice is to be expressed can be readily inserted into the envelope 33 and enclosed therein by folding over the flap 38. This form of envelope can be readily made of high wet strength paper or of cellophane using an appropriately juice-resistant adhesive to seal the seams 37.

Figure 5:
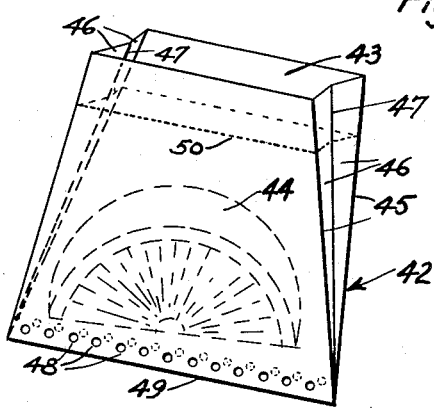

The envelope 42 of Figure 5 is made of a flat trapezoidiform sack, having an opening 43 along its upper edge for receiving a wedge 44 (or slice) of citrus fruit. To facilitate insertion of the fruit, the lateral edge portions of the envelope are folded inward along slanted fold lines 45 converging to meet at or near the lower corners, and form a pair of triangular panels 46 at each side, joined at a medial reverse fold 47 which was originally the lateral edge of the trapezoidiform sack. A series of perforations 48 adjacent the lower edge 49 are formed to allow juice expressed from the fruit wedge 44 to flow out of the envelope while retaining seeds and larger pulp fragments. To enclose the fruit wedge during use, the upper end of the envelope including opening 43 can be flattened and folded over along transverse fold line 50. This form of envelope is especially convenient for wedges of fruit, although it can also be used for slices of other shapes.

Each of the envelopes described above is employed in the manner explained in the general description, and in each case, afford similar advantages. Advertising matter or decorative designs can be applied to the envelopes, and the materials of which they are made can be colorless, white, or of any desired color. For most purposes, especially for citrus fruits, the greatest dimension need not substantially exceed 4 inches and the perforations can be suitably made of a size from $\frac{1}{16}$ to $\frac{1}{8}$ inch across. In general, the narrowest dimension of the envelope is not substantially less than 1½ inch.

Variations and modifications which will be obvious to those skilled in the art can be made in the foregoing embodiments without departing from the spirit and scope of my invention.

I claim:

A device for manually expressing juice from a piece of pulpy fruit, said device being an envelope of flexible sheet material, substantially impervious and inert toward the fruit and its juice during contact therewith and of sufficient strength to withstand without rupture the pressure applied in manually expressing juice from fruit inserted therein, said envelope having an open top for the insertion of a piece of fruit to be expressed, and a closed bottom defining an edge lying along a fold line connecting opposed faces of the envelope, said opposed faces of the envelope having the shape of an isosceles trapezoid with the greater of the two parallel sides of the trapezoid being at the bottom of the envelope and the lesser of the two parallel sides thereof defining opposed edges at the open top of the envelope, the slanted sides of said opposed faces of said envelope being connected by two side panels having the shape of isosceles triangles, the bases of the triangles defining edges connecting said first mentioned edges at the open top of the envelope, and the apex of said triangles lying at opposite ends of the fold line at the bottom of said envelope, there being fold lines along the median of the triangular panels providing infolding portions whereby the opposed faces of the envelope may be folded from an open to a flattened condition, said panels defining downwardly and outwardly slanting side surfaces for directing expressed fruit juice toward the bottom of the envelope, there being perforations in said opposed faces adjacent said bottom edge for permitting the juice to flow readily therethrough, the top portion of said envelope being foldable along a transverse fold line to close said open top, said foldable top portion being adapted to be held by finger pressure sufficiently to prevent the passage of juice therefrom, and to force the juice through said perforations.

References Cited in the file of this patent

UNITED STATES PATENTS

| Number | Name | Date |
|---|---|---|
| 1,163,507 | Carroll | Dec. 7, 1915 |
| 1,676,102 | Lynam | July 3, 1928 |
| 1,692,777 | Jewell | Nov. 20, 1928 |
| 1,858,435 | Conlon | May 17, 1932 |
| 2,279,327 | Kehr | Apr. 14, 1942 |
| 2,325,942 | Drake | Aug. 3, 1943 |
| 2,399,000 | Carroll | Apr. 23, 1946 |